(12) United States Patent
Hutton et al.

(10) Patent No.: US 7,545,196 B1
(45) Date of Patent: Jun. 9, 2009

(54) CLOCK DISTRIBUTION FOR SPECIALIZED PROCESSING BLOCK IN PROGRAMMABLE LOGIC DEVICE

(75) Inventors: Michael D. Hutton, Mountain View, CA (US); Kumara Tharmalingam, Mountain View, CA (US); Yi-Wen Lin, Pasadena, CA (US); David Neto, Toronto (CA)

(73) Assignee: Altera Corporation, San Jose, CA (US)

( * ) Notice: Subject to any disclaimer, the term of this patent is extended or adjusted under 35 U.S.C. 154(b) by 150 days.

(21) Appl. No.: 11/550,132

(22) Filed: Oct. 17, 2006

Related U.S. Application Data

(60) Provisional application No. 60/810,765, filed on Jun. 2, 2006.

(51) Int. Cl.
*G06F 1/04* (2006.01)
(52) U.S. Cl. .................................. 327/291; 327/565
(58) Field of Classification Search .................. None
See application file for complete search history.

(56) References Cited

U.S. PATENT DOCUMENTS 6,028,463 A * 2/2000 Albu et al. ................. 327/291
7,145,362 B1 * 12/2006 Bergendahl et al. ........... 326/47
7,178,075 B2 * 2/2007 Warnock et al. ............. 714/731
2005/0242867 A1 * 11/2005 Ghia et al. .................. 327/291

OTHER PUBLICATIONS

Altera Corporation, "DSP Blocks in Stratix® II ad Stratix® II GX Devices," *Stratix® II Device Handbook*, vol. 2, pp. 6-1 through 6-34 (Feb. 2007).

* cited by examiner

*Primary Examiner*—Cassandra Cox
(74) *Attorney, Agent, or Firm*—Ropes & Gray LLP; Jeffrey H. Ingerman

(57) ABSTRACT

Clocks are distributed efficiently to regions of a specialized processing block in a PLD. Multiple clocks are selected from a larger universe of clocks and distributed to the specialized processing block, but the choices of clocks at the individual functional regions, or stages of functional regions, are less than fully flexible. In some cases, an entire region may use one clock. In another case, portions of a stage within a region that previously had been able to select individual clocks must use one clock for the entire stage. In another case, only a subset of the selected clocks is available for a particular region, but that subset is flexibly distributable within the region. In another case, a clock may be selectable for each stage of each functional region directly from the larger universe of available clocks, avoiding the need for circuitry to select the multiple clocks from the larger universe.

26 Claims, 9 Drawing Sheets

CLOCK DISTRIBUTION FOR SPECIALIZED PROCESSING BLOCK IN PROGRAMMABLE LOGIC DEVICE

CROSS REFERENCE TO RELATED APPLICATION

This claims the benefit of copending, commonly-assigned U.S. Provisional Patent Application No. 60/810,765, filed Jun. 2, 2006, which is hereby incorporated by reference herein in its entirety.

BACKGROUND OF THE INVENTION

This invention relates to programmable logic devices (PLDs), and, more particularly, to clocking arrangements for specialized processing blocks which may be included in such devices.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, a PLD sold by Altera Corporation, of San Jose, Calif., under the name STRATIX® II includes DSP blocks, each of which includes four 18-by-18 multipliers. Each of those DSP blocks also includes adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed. In order to support four 18-by-18 multiplication operations, the block has 4×(18+18)=144 inputs. Similarly, the output of an 18-by-18 multiplication is 36 bits wide, so to support the output of four such multiplication operations, the block also has 36×4=144 outputs.

Because a specialized processing block such as a DSP block may be used for a single operation or for multiple operations, it may be desirable to be able to clock different portions of the specialized processing block separately. In the foregoing example of a DSP block that can be configured as four smaller multipliers, each portion, or quadrant, of the block, representing one multiplier in that example, might be clocked separately. Moreover, within each quadrant, there may be multiple pipelined stages, which might be clocked separately.

In a known arrangement, a plurality of clocks is selected from a universe of available clocks and made available to the DSP block. In one known embodiment, the plurality of clocks is equal in number to the number of portions—e.g., four—in the DSP block, one clock being derived from the universe of clocks by clock selection circuitry in each portion, but all clocks so derived being shared among all portions. Thus, in that known embodiment, the universe of clocks may include six clocks (which typically are selected, or "muxed down," from an even larger number of clocks on the PLD, and provided, e.g., to a row of DSP blocks). Each quadrant of the DSP block selects one clock, so that four clocks are selected within that DSP block, and those four clocks are shared among all four quadrants of that DSP block (a different four of the six clocks may be selected by another DSP block sharing the same universe of clocks). In this known arrangement, within each quadrant, all four clocks are made available to each stage within the quadrant as well. Moreover, in the input multiplicand register stage, the registers for different groups of multiplicands associated with different multipliers can separately select from among all four clocks.

Such a clock arrangement is highly flexible, allowing each of the four clocks selected from the universe of six clocks to be selected separately by each stage of each quadrant of the DSP block (and separately by the two registers of the input stage). However, the clock distribution network necessary to support such flexible arrangement is area-intensive. It would be desirable to be able to provide a clocking arrangement for a specialized processing block in a PLD that is flexible but also efficient.

SUMMARY OF THE INVENTION

The present invention relates to clocking arrangement for specialized processing blocks for PLDs wherein the clocking arrangement is more efficient than previous clocking arrangements, while retaining at least some flexibility in distributing clocks.

According to the present invention, multiple clocks are selected from a larger universe of clocks and distributed to a specialized processing block as above, but the choices of clocks at the individual functional regions (e.g., quadrants) or stages of functional regions of the specialized processing block may be reduced. Thus, in one preferred embodiment, instead of having the ability to select a clock separately from among those multiple clocks for different groups of input registers in the input stage of a functional region, the user may be required to select only one clock for all input registers in the input stage of that functional region, while retaining the ability to select other clocks from among those multiple clocks for other stages in that functional region. Alternatively, in another preferred embodiment, the user may be required to select only one clock from among those multiple clocks for all stages of a functional region, while retaining the ability to select other clocks from among those multiple clocks for other functional regions in the specialized processing block.

In another preferred embodiment, instead of selecting multiple clocks from a larger universe of clocks and then distributing them as described above, the user may select a clock for each stage of each functional region directly from the larger universe of available clocks. This is still efficient because circuitry for selecting multiple clocks from the larger universe of clocks is not needed, and only one wire is needed within each functional region to distribute the clock selected for that region.

In yet other preferred embodiments, after the multiple clocks are selected from the larger universe of clocks, a first subset of the multiple clocks is made available to at least one of the functional regions and a second subset of the multiple clocks is made available to at least one other of the functional regions. In one such preferred embodiment, the subsets are fixed, with certain of the multiple clocks conducted to one group of functional regions for further distribution, and others of the multiple clocks conducted to another group of functional regions for further distribution. In another such preferred embodiment, the subsets are programmably selectable, so that the subsets may overlap, with some clocks possibly being in more than one subset and others possibly being in no subset.

In any of the foregoing preferred embodiments, the user may further be able to invert or turn off a clock. If the user is given the option of turning off a clock, the option may be implemented by offering an option of (a) connecting the clock input to ground, which is always available anywhere on the PLD and therefore requires no additional wires, (b) connecting the clock input to a configuration bit of the PLD, which offers some additional flexibility, or (c) using a controllable enable signal, which requires a wire but offers the most flexibility to control the clock.

Therefore, in accordance with the present invention, there is provided a clock distribution network for a specialized processing block in a programmable logic device, which programmable logic device has a first plurality of available clock signals, and which specialized processing block has a second plurality of functional areas each having a plurality of stages. The clock distribution network includes first selection circuitry that programmably selects a third plurality of clock signals from among the first plurality of available clock signals (the third plurality being smaller than the first plurality), second selection circuitry that programmably selects, for each of those functional areas, only one clock signal from among the third plurality of clock signals, and distribution circuitry in each respective one of the functional areas that distributes the one clock signal to the stages of that respective functional area.

There also is provided a clock distribution network for a specialized processing block in a programmable logic device, which programmable logic device has a first plurality of available clock signals, and which specialized processing block has a second plurality of functional areas each having a plurality of stages including an input register stage. The clock distribution network includes first selection circuitry that programmably selects a third plurality of clock signals from among the first plurality of available clock signals for distribution to the second plurality of functional areas (the third plurality being smaller than the first plurality), and second selection circuitry that programmably selects, for each stage in each of those functional areas, only one clock signal from among the third plurality of clock signals. In any one of the functional areas, the second selection circuitry selects only one signal for all registers in the input register stage.

There also is provided a clock distribution network for a specialized processing block in a programmable logic device, which programmable logic device has a first plurality of available clock signals, and which specialized processing block has a second plurality of functional areas each having a plurality of stages including an input register stage having input registers for a plurality of operands. The clock distribution network includes first selection circuitry that programmably selects a third plurality of clock signals from among the first plurality of available clock signals for distribution to the second plurality of functional areas (the third plurality being smaller than the first plurality), second selection circuitry in at least one of the functional areas that programmably selects, for each stage other than the input register stage, only one clock signal from among a first subset of the third plurality of clock signals, and that programmably selects for different respective portions of the input register stage only one respective clock signal from among the first subset of the third plurality of clock signals, and third selection circuitry in at least one of the functional areas that programmably selects, for each stage other than the input register stage, only one clock signal from among a second subset of the third plurality of clock signals, and that programmably selects for different respective portions of the input register stage only one respective clock signal from among the second subset of the third plurality of clock signals. Each of the first and second subsets includes a number of clock signals smaller than the third plurality of clock signals.

There also is provided a clock distribution network for a specialized processing block in a programmable logic device, which programmable logic device has a first plurality of available clock signals, and which specialized processing block has a second plurality of functional areas each having a plurality of stages. The clock distribution network includes respective selection circuitry that programmably selects, for each stage in each functional area, one of the first plurality of clock signals, so that only one clock signal per stage is propagated through each functional area.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-9.

Figure 1:
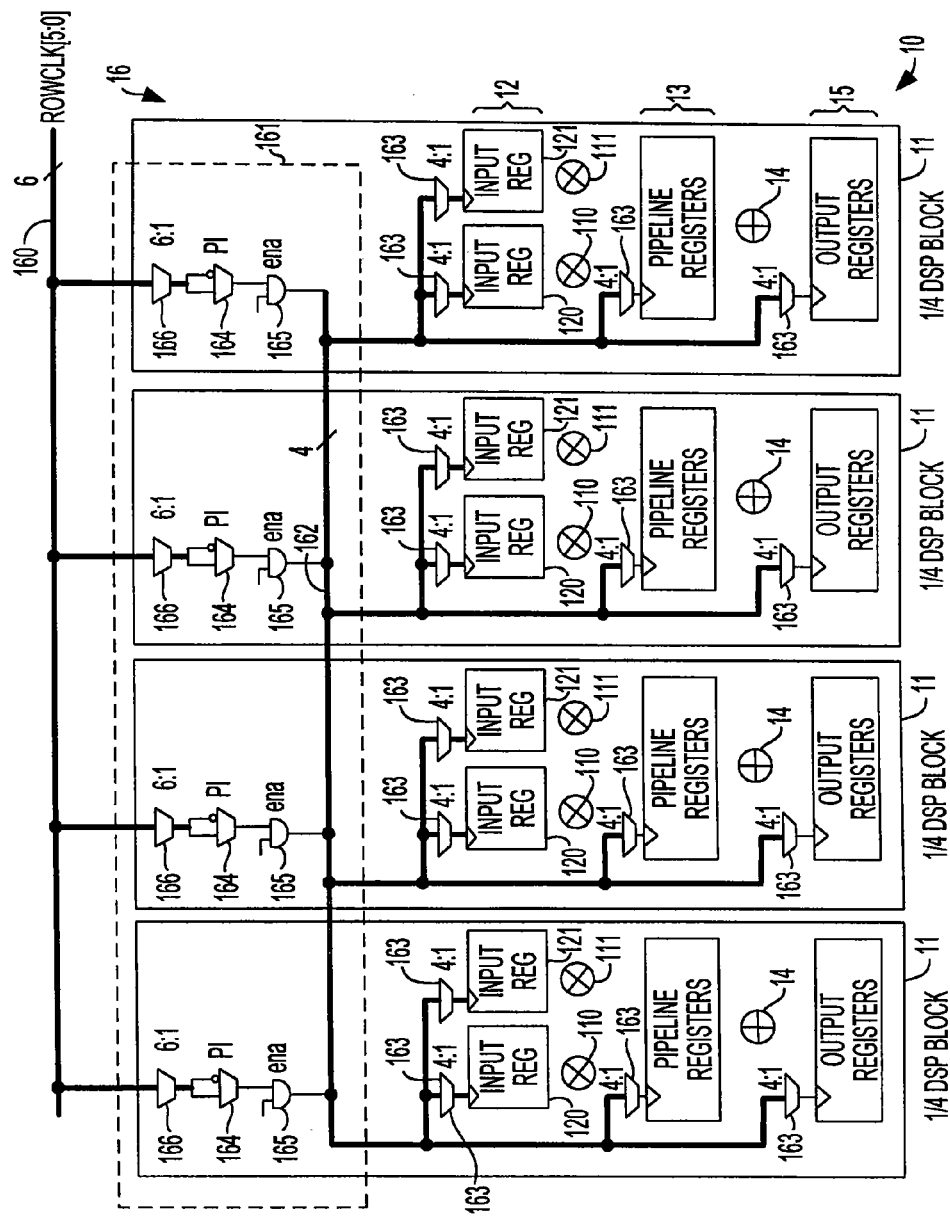
FIG. 1 is a schematic representation of a specialized processing block for a programmable logic device, with a known clock distribution arrangement.

FIG. 1 is a schematic representation of a specialized processing block 10 for a programmable logic device, with a known clock distribution arrangement 16. Specialized processing block 10 could be any type of specialized processing block including, but not limited to, crossbars, floating-point units, barrel shifters or other function-specific blocks. In this case, specialized processing block 10 is shown as a multiply-accumulate/DSP block of the type described above. DSP block 10 has, in this case, four functional areas or quadrants 11, each of which has two multipliers 110, 111 preceded by an input register stage 12 including a group 120 of registers appurtenant to multiplier 110 and a group 121 of registers appurtenant to multiplier 111. Multipliers 110, 111 are followed by a pipeline register stage 13, which in turn is followed by an adder 14 and an output register stage 15.

Clock distribution arrangement 16 includes a first group 160 of available clocks. In this arrangement, group 160 includes six clocks that have been selected from among the larger number of clocks available on the PLD and made available to a row of DSP blocks 10 (only one DSP block 10 shown). Selection circuitry 161 selects four of the six available clocks for sharing by the four quadrants 11 via clock bus 162. In this case, selection circuitry 161 includes a respective 6:1 multiplexer 166 associated with each quadrant 11, which selects one of the six clocks 160 but shares it on bus 162 with the other quadrants 11. The four clocks 200 are distributed by bus 162 to a plurality of 4:1 multiplexers 163, one of which is associated with each of register groups 120, register groups 121, pipeline register stages 13 and output register stages 15. Selection circuitry 161 also includes inversion circuitry 164 and enable circuitry 165.

It is apparent that this known clock distribution arrangement 16 is fully flexible, allowing any of the four clocks 200 selected by selection circuitry 161 to be used simultaneously by any of register groups 120, register groups 121, pipeline register stages 13 and output register stages 15. However, as discussed above, such an arrangement is area-intensive, requiring the routing of four conductors throughout DSP block 10, as well as numerous 6:1 and/or 4:1 multiplexers. In the exemplary DSP block 10 of FIG. 1, in particular, this would includes 18×2 (for the input registers) plus 37×1 (for the pipeline registers) plus 38×1 (for the output registers) times 4 signals times 4 quadrants for a total of 1776 conductors and 444 4:1 muxes.

Figure 2:
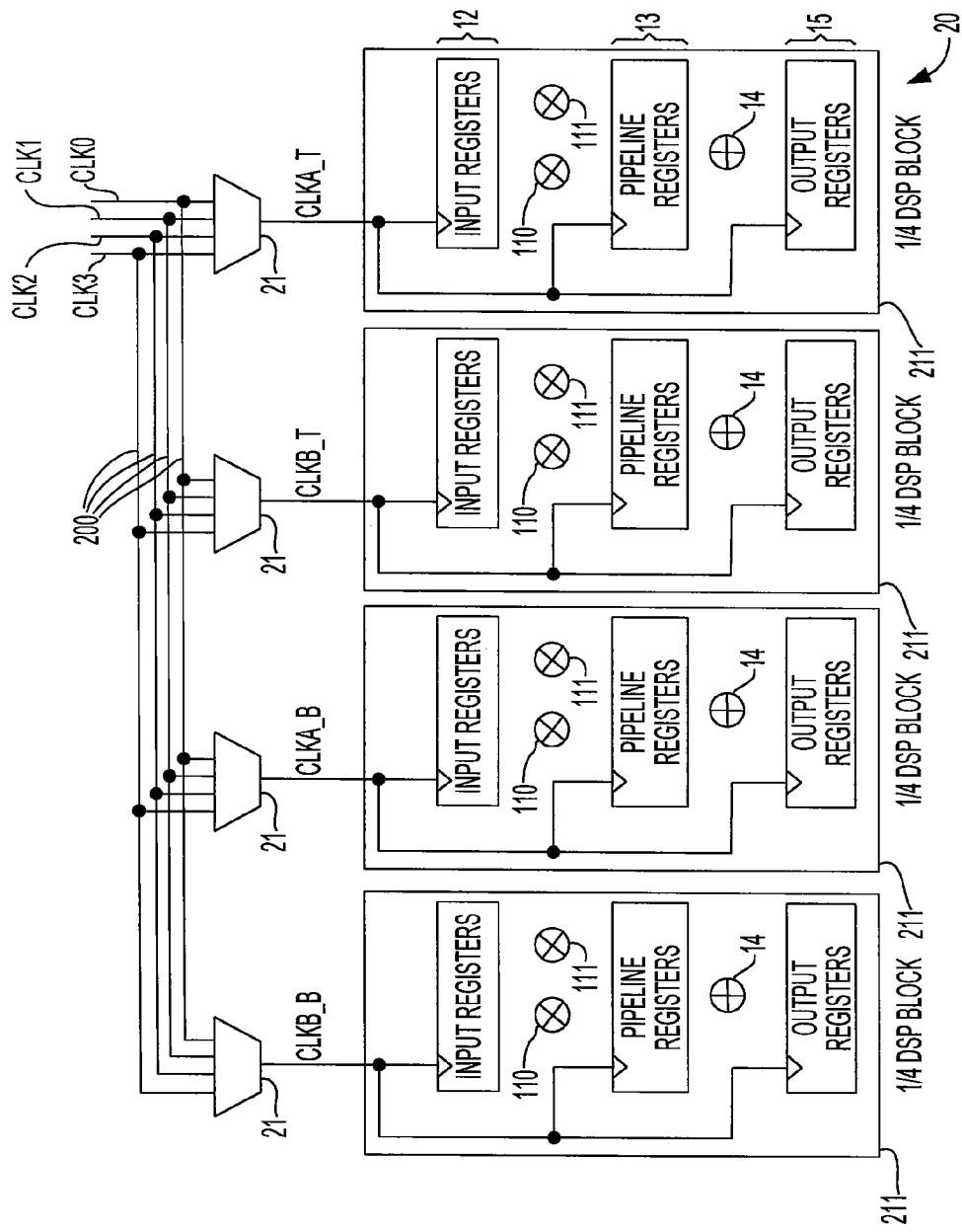
FIG. 2 is a schematic representation of a specialized processing block for a programmable logic device, with a first preferred embodiment of a clock distribution arrangement in accordance with the present invention.

Thus, in a first preferred embodiment 20 according to the invention, shown in FIG. 2, instead of conducting all four clocks 200 throughout all four quadrants 211 of specialized processing blocks 10, each quadrant 211 preferably has associated therewith a respective 4:1 multiplexer 21 to which the four clocks 200 are input. Each multiplexer 21 preferably selects one of the four clocks 200 for use in its associated quadrant 211. each respective selected clock preferably is used by all stages of respective quadrant 11. This arrangement 20 requires only one wire to carry the selected clock throughout quadrant 211, rather than the four wires required in FIG. 1, and replaces the four 4:1 multiplexers in each quadrant 11 in FIG. 1 with one 4:1 multiplexer associated with each quadrant 211.

Figure 3:
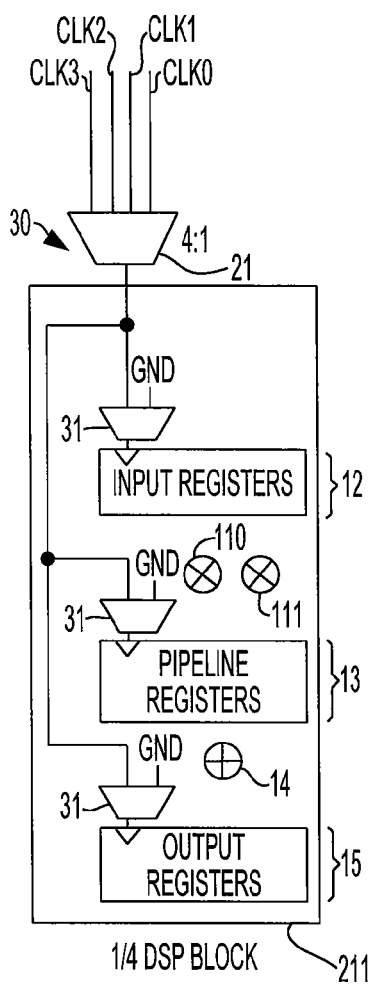
FIG. 3 is a schematic representation of one functional area of the specialized processing block of FIG. 2, showing a first preferred embodiment of distribution circuitry according to the present invention.
Figure 4:
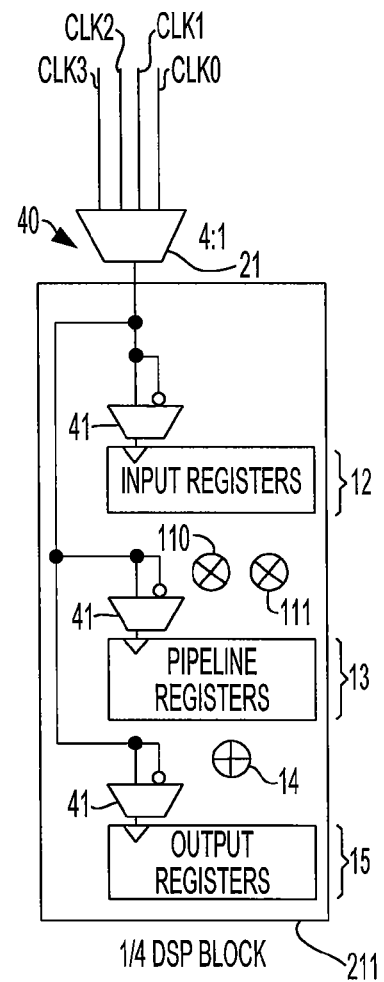
FIG. 4 is a schematic representation of one functional area of the specialized processing block of FIG. 2, showing a second preferred embodiment of distribution circuitry according to the present invention.
Figure 5:
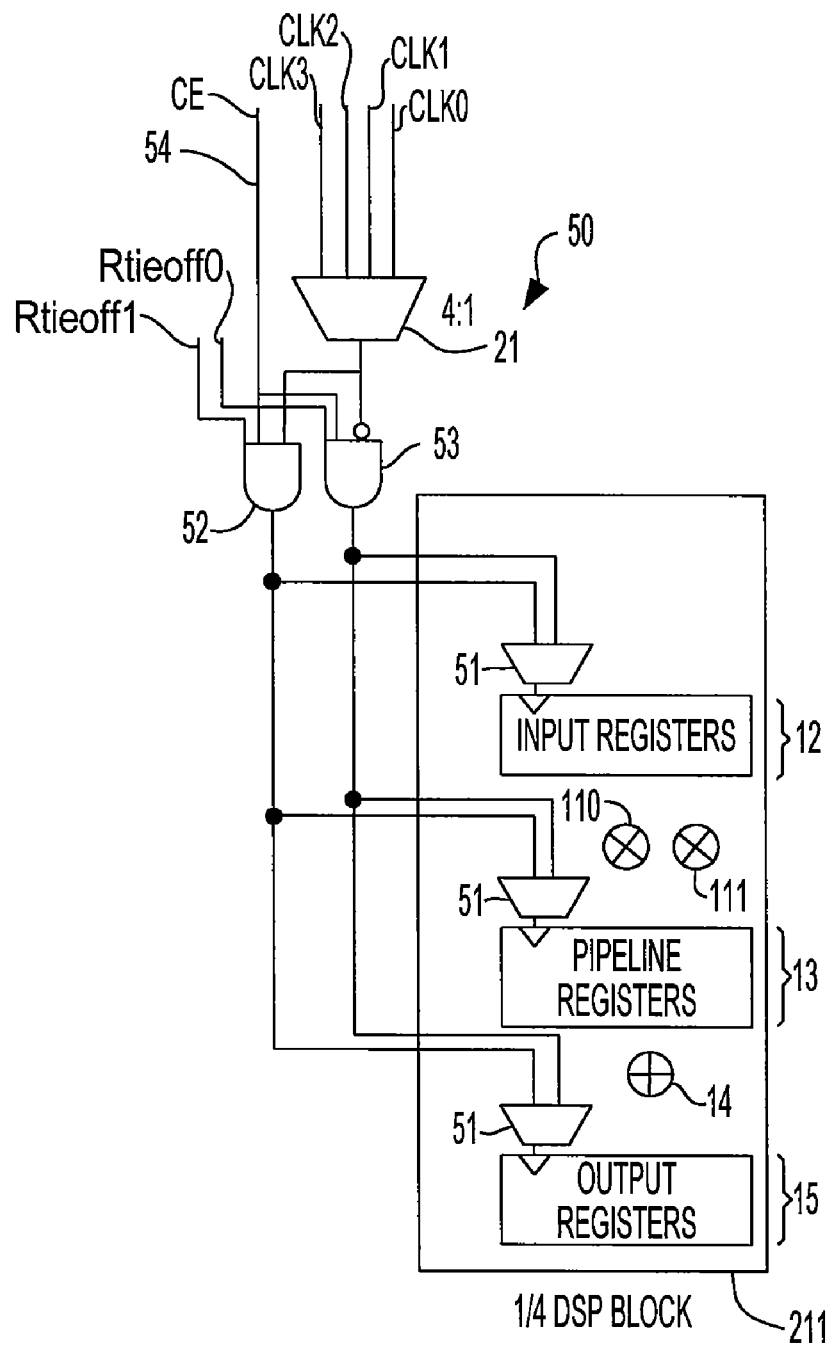
FIG. 5 is a schematic representation of one functional area of the specialized processing block of FIG. 2, showing a third preferred embodiment of distribution circuitry according to the present invention.

Although the clock distribution circuitry within each quadrant 211 is shown in FIG. 2 as a single multiplexer 21 and a single wire, alternate preferred embodiments of the distribution circuitry within a quadrant 211 are shown in FIGS. 3-5.

Clock distribution circuitry 30 of FIG. 3 preferably adds a respective 2:1 multiplexer 31 at the clock input of each stage 12, 13, 15. One input of multiplexer 31 preferably is the clock selected by multiplexer 21, while the other input of multiplexer 31 preferably is ground. This allows a particular stage to be turned off when not in use to conserve power (the most likely stage to be turned off is pipeline register stage 13, although either of the other stages 12, 15 may be turned off). Because access to ground is available everywhere on the PLD of which specialized processing block 10 is a part, this arrangement avoids the need to route a logic 0 to specialized processing block 10, conserving routing and interconnect resources of the PLD. Nor is it necessary to route a control signal for multiplexers 31, as they can be configured with PLD configuration bits. Although this arrangement calls for three additional 2:1 multiplexers, a 2:1 multiplexer consumes less area and fewer resources than a 4:1 multiplexer. It should further be understood that a 2:1 multiplexer controlled by a configuration bit can be implemented in other ways. For example, an AND gate having as inputs the configuration bit and the signal accomplishes similar functionality of choosing between the signal and ground. Similarly, an OR gate having those inputs accomplishes similar functionality of choosing between the input and Vcc. Either of those alternatives may be preferred in specific embodiments of the current invention for reasons of, e.g., limiting transistor area, propagation delay or power consumption.

Like clock distribution circuitry 30 of FIG. 3, clock distribution circuitry 40 of FIG. 4 preferably adds a respective 2:1 multiplexer 41 at the clock input of each stage 12, 13, 15. One input of multiplexer 41 preferably is again the clock selected by multiplexer 21, while in this case the other input of multiplexer 41 preferably is the inverse of that clock. Inverting the clock of a stage (again the most likely, but not the only, stage where this might be done is pipeline register stage 13) rather than simply turning that stage off may reduce dynamic power consumption and also may avoid signal anomalies that may arise when a stage is turned off.

Clock distribution circuitry 50 of FIG. 5 combines the benefits of clock distribution circuitry 30 and clock distribution circuitry 40 by adding two 3-input AND gates 52, 53 in addition to 2:1 multiplexers 51. AND gate 52 preferably can output the clock selected by multiplexer 21 to one input of each of multiplexers 51, while AND gate 53 preferably can output the inverse of that clock to the other input of each of multiplexers 51. In addition, both inputs to each of multiplexers 51 preferably can be turned off by clock enable signal 54 which is a second input to each AND gate 52, 53, while each AND gate 52, 53 also preferably can be tied off individually to, e.g., ground or a PLD configuration bit. As compared to clock distribution circuitry 30 or clock distribution circuitry 40, clock distribution circuitry 50 adds two 3-input AND gates and a second wire, and also requires that clock enable signal 54 be routed to specialized processing block 10. Nevertheless, clock distribution circuitry 50 is still more efficient than clock distribution arrangement 16.

Figure 6:
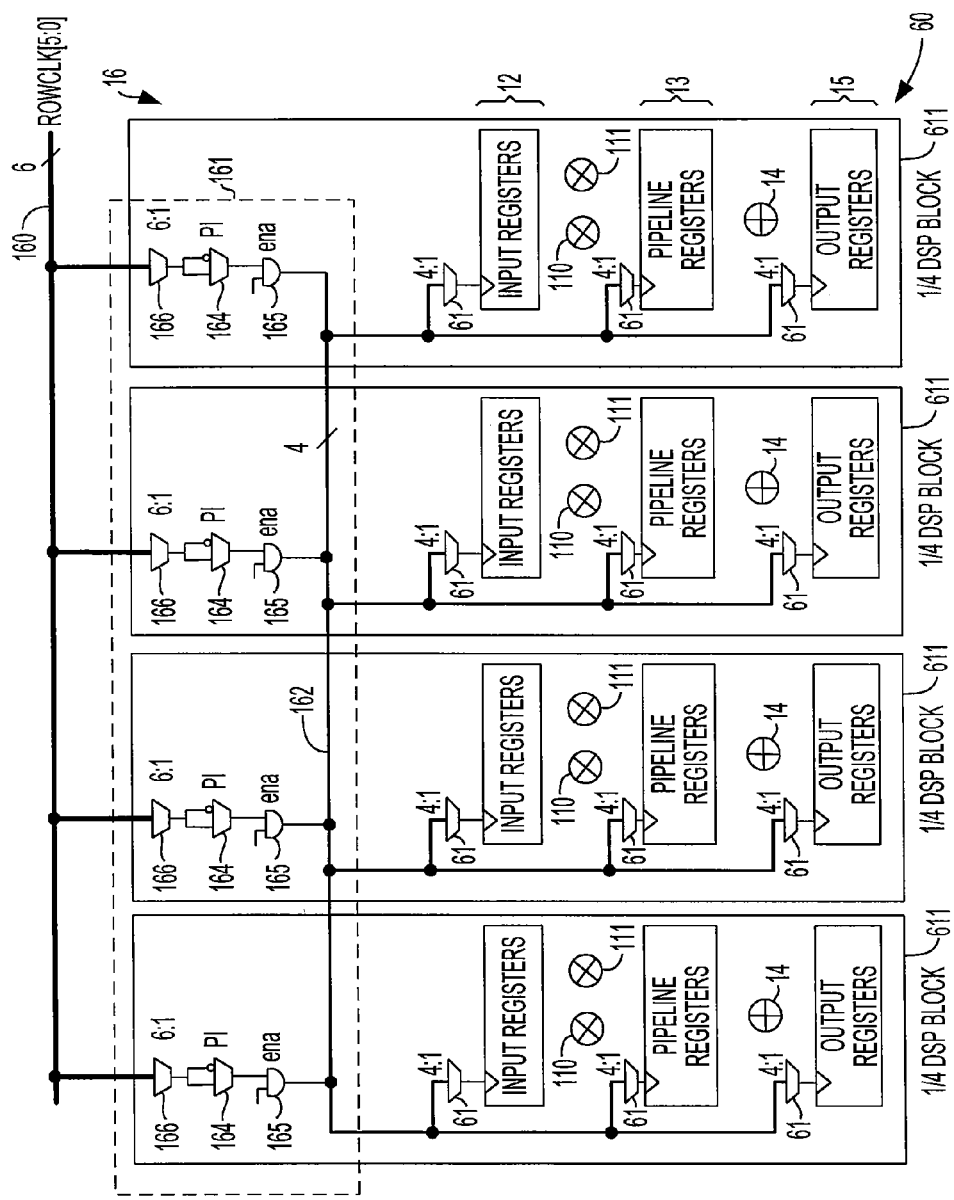
FIG. 6 is a schematic representation of a specialized processing block for a programmable logic device, with a second preferred embodiment of a clock distribution arrangement in accordance with the present invention.

In a second preferred embodiment 60 according to the invention, shown in FIG. 6, all four clocks 200 preferably are conducted throughout all four quadrants 611 of specialized processing block 10 as in clock distribution arrangement 16.

A separate 4:1 multiplexer 61 preferably is provided at each stage 12, 13, 15 of each quadrant 611. Unlike clock distribution arrangement 16, preferably only one multiplexer 61 is provided for input register stage 12, rather than having separate multiplexers 61 for group 120 of registers appurtenant to multiplier 110 and a group 121 of registers appurtenant to multiplier 111. This arrangement is almost as flexible as arrangement 16 but saves one multiplexer 61 per quadrant 611 as well as the wires that otherwise would be associated with each of those multiplexers 61.

In third and fourth preferred embodiments of the invention, each quadrant preferably receives two of the four clock signals 200.

Figure 7:
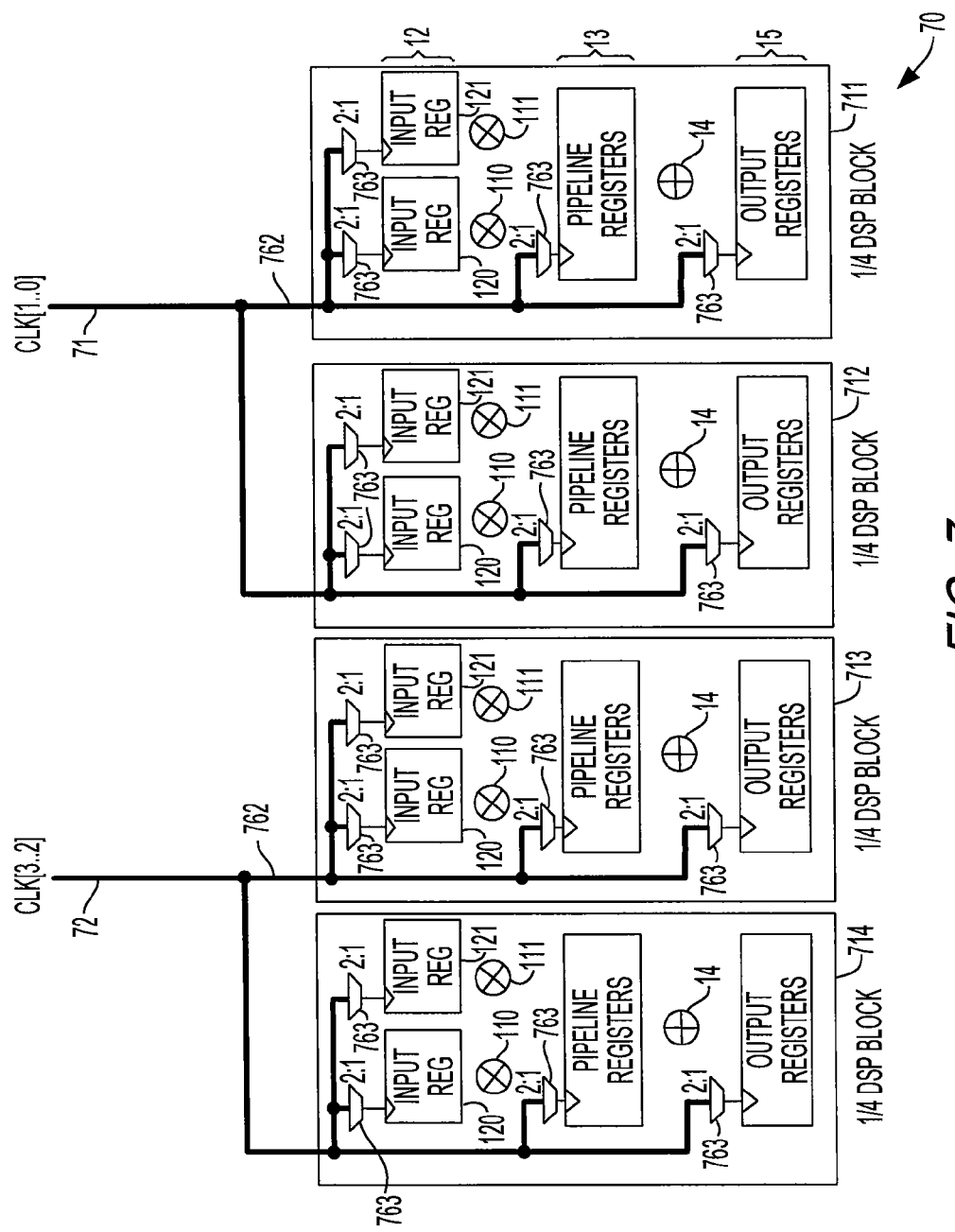
FIG. 7 is a schematic representation of a specialized processing block for a programmable logic device, with a third preferred embodiment of a clock distribution arrangement in accordance with the present invention.

In the third preferred embodiment 70 shown in FIG. 7, the four clocks 200 preferably are divided into groups 71, 72 of two clock signals each. One group 71 preferably is distributed to two quadrants 711, 712, while the other group 72 preferably is distributed to two quadrants 713, 714. Within each quadrant 711-14, the two clock signals preferably are distributed in a manner similar to arrangement 16. Specifically, the two clocks 200 preferably are distributed by bus 762 to a plurality of 2:1 multiplexers 763, one of which preferably is associated with each of register groups 120, register groups 121, pipeline register stages 13 and output register stages 15. Although similar to arrangement 16, this embodiment 70 requires only two wires instead four wires in each quadrant, and requires 2:1 multiplexers which are smaller than the 4:1 multiplexers of arrangement 16. Alternatively, although not shown in FIG. 7, a single 2:1 multiplexer 763 could serve both register group 120 and, register group 121 of input register stage 12.

Figure 8:
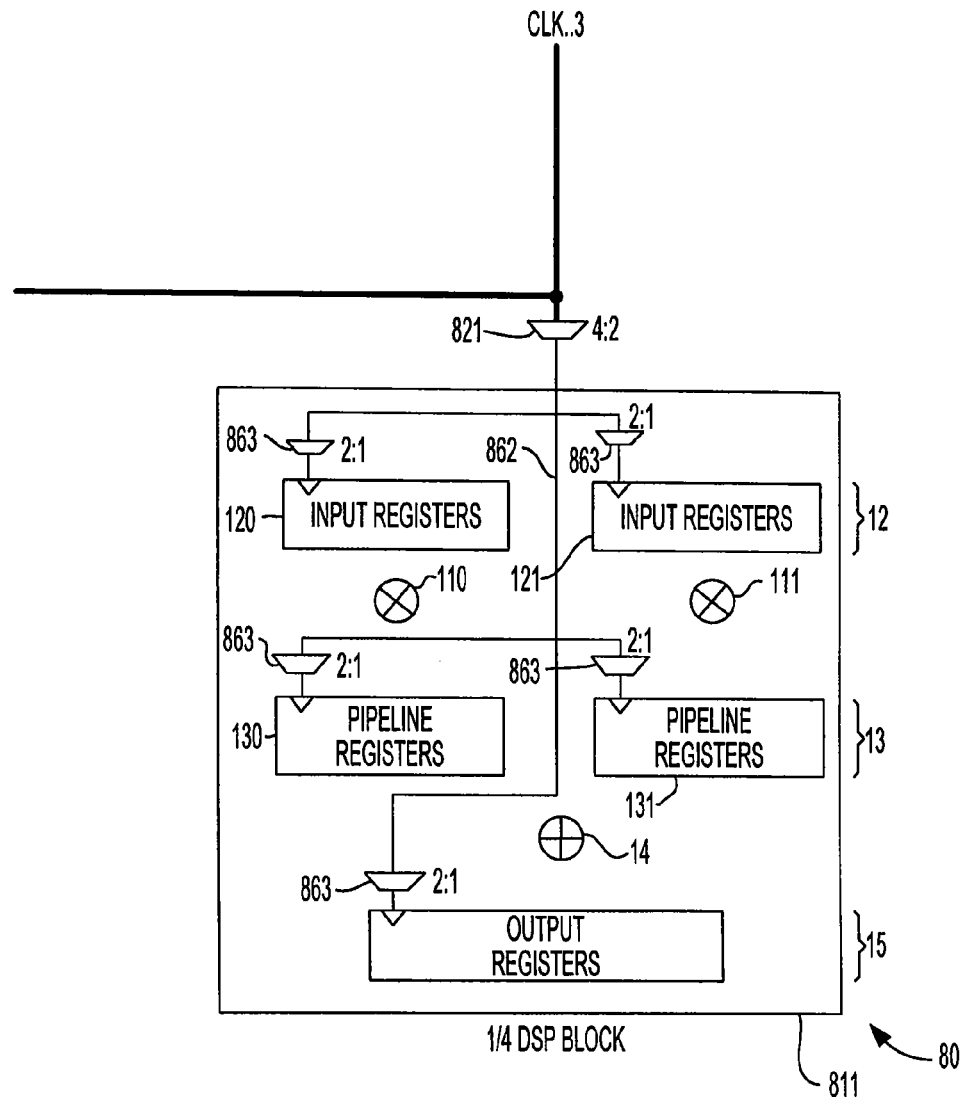
FIG. 8 is a schematic representation of a specialized processing block for a programmable logic device, with a fourth preferred embodiment of a clock distribution arrangement in accordance with the present invention.

The fourth preferred embodiment 80 shown in FIG. 8 resembles embodiment 20 of FIG. 2 in that all four clocks 200 are conducted to a multiplexer 821. Each multiplexer 821 preferably is similar to multiplexer 21 of embodiment 20, except that it preferably is a 4:2 multiplexer instead of a 4:1 multiplexer. Each quadrant 811 of embodiment 80 preferably is substantially similar to quadrants 711-14 of embodiment 70, in that the two clocks selected by multiplexer 821 preferably are distributed by bus 862 to a plurality of 2:1 multiplexers 863, one of which preferably is associated with each of register groups 120, register groups 121, pipeline register stages 13 and output register stages 15. However, in quadrant 811 pipeline register stage preferably is divided into two register groups 130, 131 which may be separately clocked. Again, as an alternative, although not shown in FIG. 8, a single 2:1 multiplexer 863 could serve both register group 120 and, register group 121 of input register stage 12.

Figure 9:
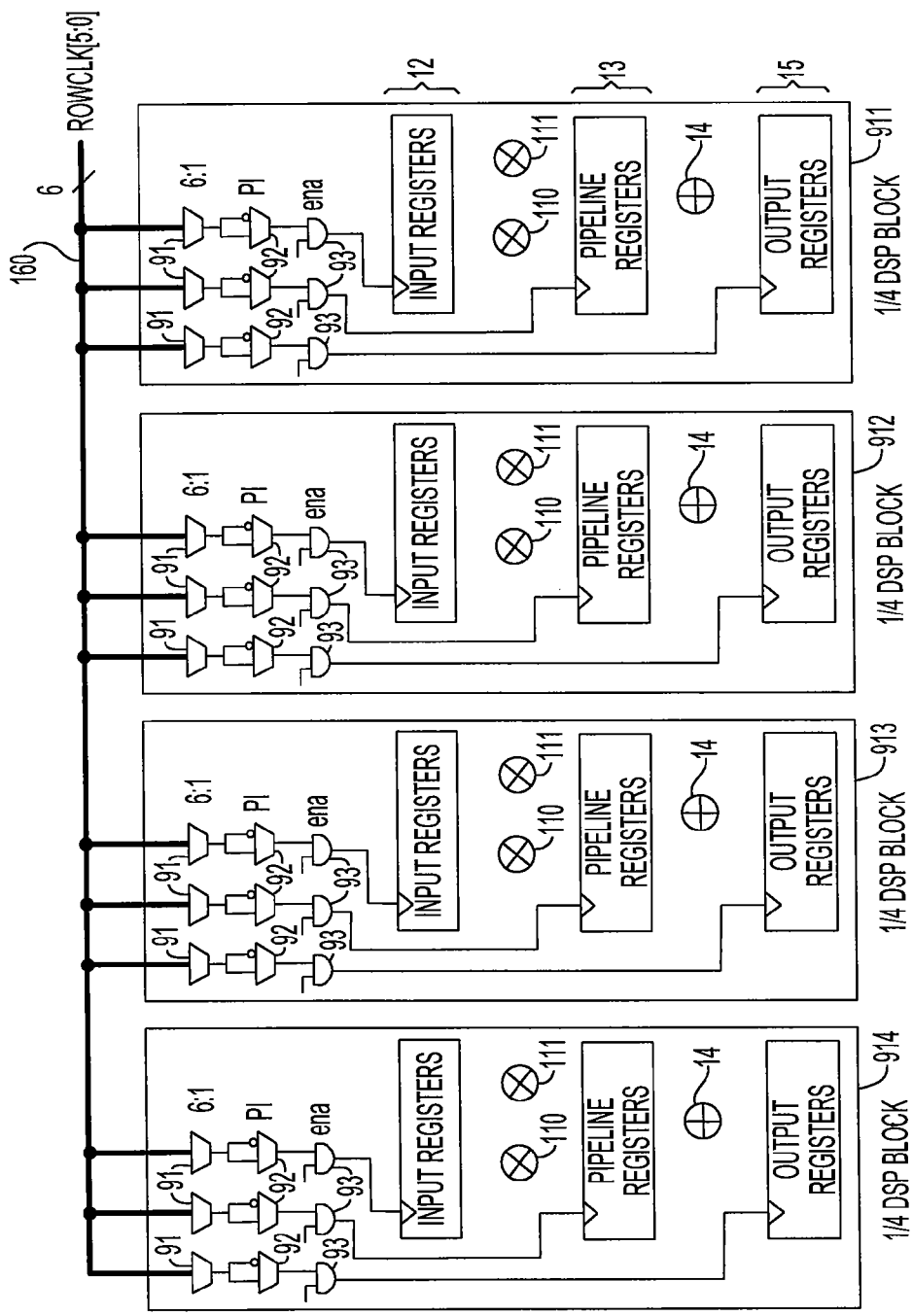
FIG. 9 is a schematic representation of a specialized processing block for a programmable logic device, with a fifth preferred embodiment of a clock distribution arrangement in accordance with the present invention.

A fifth preferred embodiment 90 is shown in FIG. 9. In this embodiment, selection circuitry 161 preferably is omitted and all clocks 160 (in the embodiment shown, six clocks) preferably are conducted directly to quadrants 911-14. Each quadrant 911-14 preferably has a respective multiplexer 91 (in the embodiment shown, a 6:1 multiplexer) associated with each respective stage 12, 13, 15 for selecting one of clocks 160 for each respective stage 12, 13, 15. Although this arrangement requires three large multiplexers per quadrant, circuitry 161 is not present, and only one wire, preferably with optional inversion circuitry 92 and optional enabling circuitry 93 as discussed above, is required between each multiplexer 91 and its respective stage 12, 13, 15.

Figure 10:
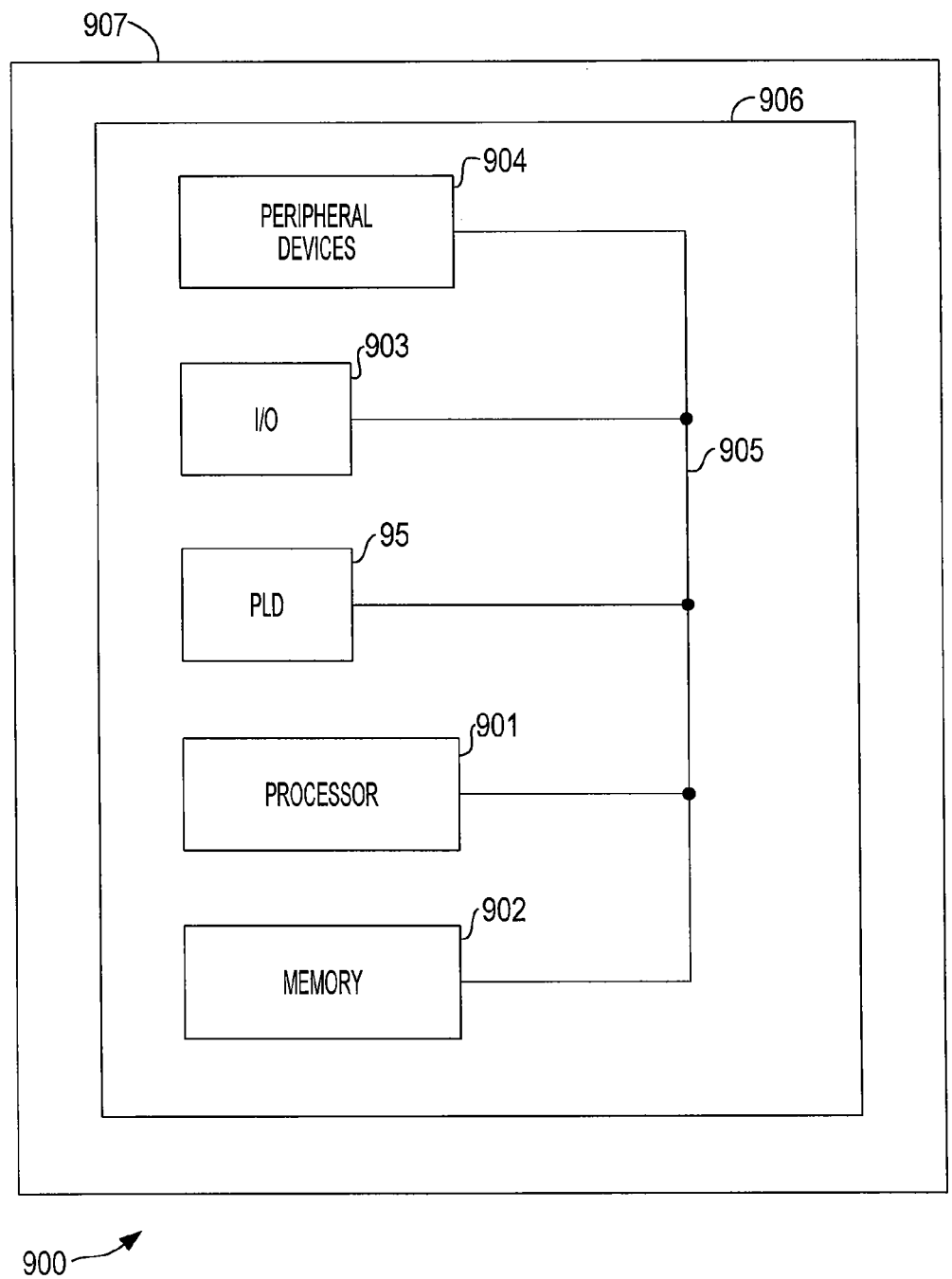
FIG. 10 is a simplified block diagram of an illustrative system employing a programmable logic device incorporating a specialized processing block in accordance with the present invention.

A PLD 95 incorporating such circuitry according to the present invention may be used in many kinds of electronic devices. One possible use is in a data processing system 900 shown in FIG. 10. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 95 can be used to perform a variety of different logic functions. For example, PLD 95 can be configured as a processor or controller that works in cooperation with processor 901. PLD 95 may also be used as an arbiter for arbitrating access to a shared resources in system 900. In yet another example, PLD 95 can be configured as an interface between processor 901 and one of the other components in system 900. It should be noted that system 900 is only exemplary, and that the true scope and spirit of the invention should be indicated by the following claims.

Various technologies can be used to implement PLDs 95 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A clock distribution network for a specialized processing block in a programmable logic device, said programmable logic device having a first plurality of available clock signals, and said specialized processing block having a second plurality of functional areas each having a plurality of stages, said clock distribution network comprising:

first selection circuitry that programmably selects a third plurality of clock signals from among said first plurality of available clock signals, said third plurality being smaller than said first plurality;

second selection circuitry that programmably selects, for each said functional area, only one clock signal from among said third plurality of clock signals; and distribution circuitry in each respective said functional area that distributes said one clock signal to said stages of said respective functional area.

2. The clock distribution network of claim 1 wherein said distribution circuitry comprises, for at least one of said stages, stage clock selection circuitry that programmably selects between said one clock signal and an alternate signal.

3. The clock distribution network of claim 2 wherein said alternate signal comprises ground.

4. The clock distribution network of claim 2 wherein said alternate signal comprises said one clock signal inverted.

5. The clock distribution network of claim 4 further comprising enable circuitry that programmably enables at least one of said one clock signal and said one clock signal inverted.

6. The clock distribution network of claim 5 wherein said enable circuit comprises, for at least one of said one clock signal and said one clock signal inverted, an AND-gate having as inputs (a) said one of said one clock signal and said one clock signal inverted, and (b) at least one of (1) a clock enable signal and (2) a tie-off signal.

7. The clock distribution network of claim 2 further comprising enable circuitry that programmably enables at least one of said one clock signal and said alternate signal.

8. The clock distribution network of claim 7 wherein said enable circuit comprises, for at least one of said one clock signal and said alternate signal, an AND-gate having as inputs (a) said one of said one clock signal and said one alternate signal, and (b) at least one of (1) a clock enable signal and (2) a tie-off signal.

9. The clock distribution network of claim 1 wherein said first selection circuitry comprises inversion selection circuitry that programmably selects between a selected clock signal and said selected clock signal inverted.

10. The clock distribution network of claim 1 wherein said first selection circuitry comprises enable circuitry that programmably enables or disables a selected clock signal.

11. A clock distribution network for a specialized processing block in a programmable logic device, said programmable logic device having a first plurality of available clock signals, and said specialized processing block having a second plurality of functional areas each having a plurality of stages including an input register stage, said clock distribution network comprising:
  first selection circuitry that programmably selects a third plurality of clock signals from among said first plurality of available clock signals for distribution to said second plurality of functional areas, said third plurality being smaller than said first plurality; and
  second selection circuitry that programmably selects, for each stage in each said functional area, only one clock signal from among said third plurality of clock signals; wherein:
  in any one of said functional areas, said second selection circuitry selects an identical signal for each register in said input register stage.

12. The clock distribution network of claim 11 wherein said first selection circuitry comprises inversion selection circuitry that programmably selects between a selected clock signal and said selected clock signal inverted.

13. The clock distribution network of claim 11 wherein said first selection circuitry comprises enable circuitry that programmably enables or disables a selected clock signal.

14. The clock distribution network of claim 11 wherein said first plurality of available clock signals consists of six clock signals.

15. The clock distribution network of claim 14 wherein said third plurality of clock signals consists of four clock signals.

16. A clock distribution network for a specialized processing block in a programmable logic device, said programmable logic device having a first plurality of available clock signals, and said specialized processing block having a second plurality of functional areas each having a plurality of stages including an input register stage having input registers for a plurality of operands, said clock distribution network comprising:
  first selection circuitry that programmably selects a third plurality of clock signals from among said first plurality of available clock signals for distribution to said second plurality of functional areas, said third plurality being smaller than said first plurality;
  second selection circuitry in at least one of said functional areas that programmably selects, for each stage other than said input register stage, only one clock signal from among a first subset of said third plurality of clock signals, and that programmably selects for different respective portions of said input register stage only one respective clock signal from among said first subset of said third plurality of clock signals; and
  third selection circuitry in at least one of said functional areas that programmably selects, for each stage other than said input register stage, only one clock signal from among a second subset of said third plurality of clock signals, and that programmably selects for different respective portions in said input register stage only one respective clock signal from among said second subset of said third plurality of clock signals; wherein:
  each of said first and second subsets includes a number of clock signals smaller than said third plurality of clock signals.

17. The clock distribution network of claim 16 wherein said first plurality of available clock signals consists of six clock signals.

18. The clock distribution network of claim 17 wherein said third plurality of clock signals consists of four clock signals.

19. The clock distribution network of claim 18 wherein each said subset of clock signals consists of two clock signals.

20. The clock distribution network of claim 16 wherein each clock signal in said first subset is different from each clock signal in said second subset.

21. The clock distribution network of claim 20 wherein:
  said first plurality of available clock signals consists of six clock signals;
  said third plurality of clock signals consists of four clock signals; and
  each said subset of clock signals consists of two clock signals.

22. The clock distribution network of claim 16 further comprising fourth selection circuitry for programmably selecting any of said third plurality of clock signals for inclusion in one or both of said first and second subsets.

23. The clock distribution network of claim 22 wherein:
  said first plurality of available clock signals consists of six clock signals;
  said third plurality of clock signals consists of four clock signals; and
  each said subset of clock signals consists of two clock signals.

24. A clock distribution network for a specialized processing block in a programmable logic device, said programmable logic device having a first plurality of available clock signals, and said specialized processing block having a second plurality of functional areas each having a plurality of stages, said clock distribution network comprising:
  respective selection circuitry that programmably selects, for each respective stage in each said functional area, only one of said first plurality of clock signals; wherein:
  for each stage in each said functional area, an identical clock signal is propagated through all portions of said stage.

25. The clock distribution network of claim 24 wherein said respective selection circuitry comprises inversion selection circuitry that programmably selects between a selected clock signal and said selected clock signal inverted.

26. The clock distribution network of claim 24 wherein said respective selection circuitry comprises enable circuitry that programmably enables or disables a selected clock signal.

\* \* \* \* \*